July 10, 1956 L. HAWKINS 2,753,841
FOWL PEN FLOOR
Filed May 21, 1954
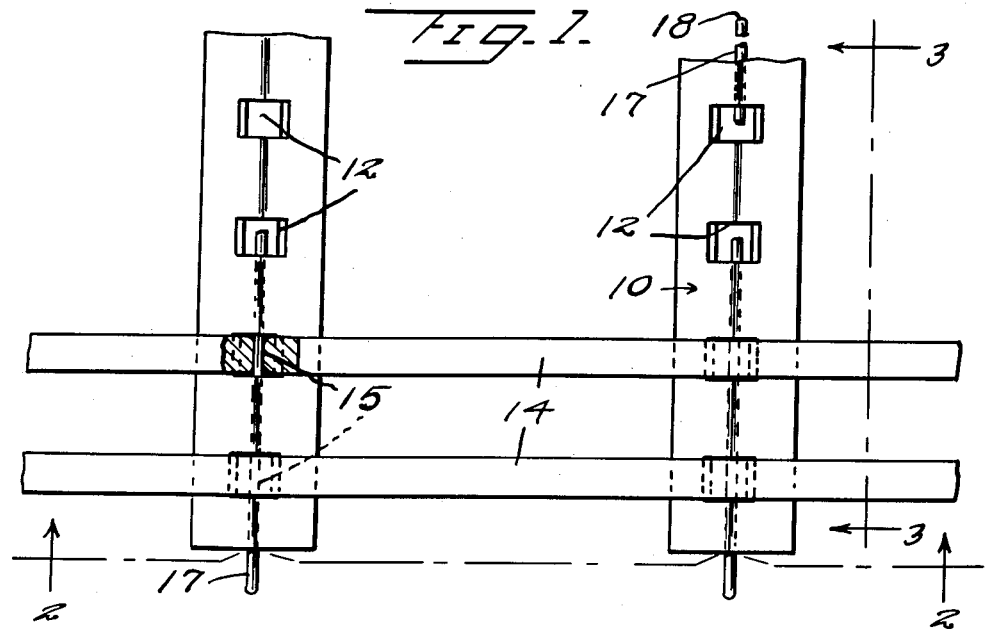
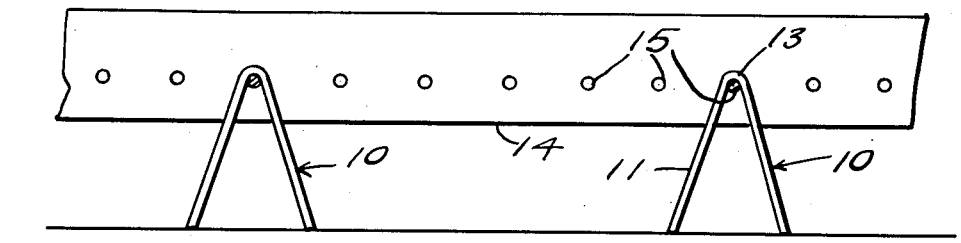
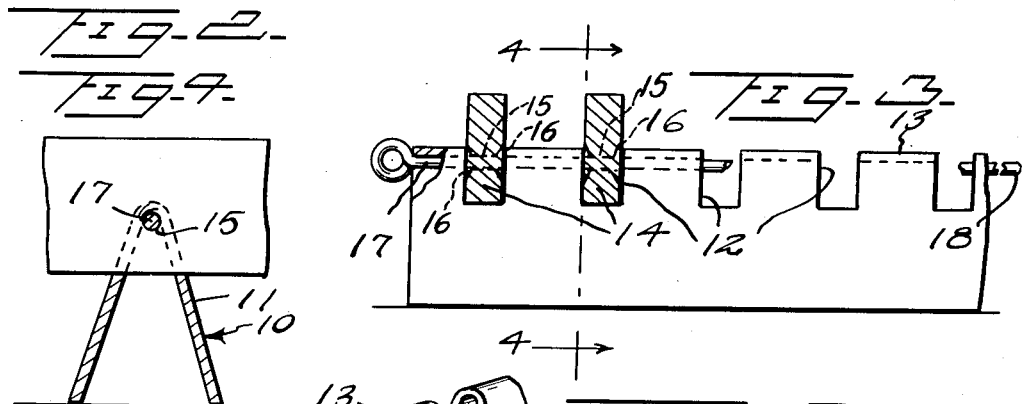
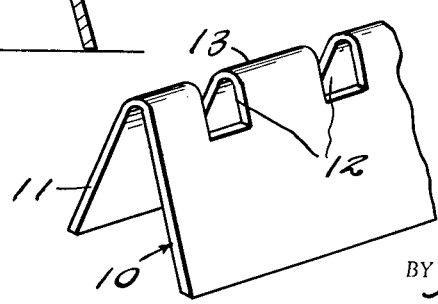
INVENTOR
*Luty Hawkins*
BY *Kimmel & Crowell*
ATTORNEYS

United States Patent Office 2,753,841
Patented July 10, 1956

2,753,841

FOWL PEN FLOOR

Luty Hawkins, Mount Vernon, Ill.

Application May 21, 1954, Serial No. 431,405

1 Claim. (Cl. 119—21)

This invention relates to an improved elevated grating floor for cages, pens, brooder houses, laying houses, sun porches, and runways for turkeys, chickens and other poultry.

An object of this invention is to provide in a housing enclosure for fowl, such as chickens, turkeys, or the like, an improved elevated grating floor having a plurality of elongated bars disposed on edge with base means detachably supporting the bars.

It is well known in connection with the raising of poultry and fowls, especially turkeys that one of the greatest hazards is diseases which usually come from unsanitary conditions in the brooder houses, runways, sun porches and the like housing enclosures. A principal object of this invention is, therefore, to eliminate all or at least a very substantial part of this hazard by providing a novel elevated grating floor whereby contact of the feet of the birds with the usual litter and/or droppings is avoided and whereby an optimum of sanitation may be obtained. The usual accumulation of droppings in the ordinary type of flooring heretofore used is a breeding place for poultry diseases and in hot weather is an acute hazard. Heretofore the birds have had no choice but to walk therein. Furthermore the expense of litter is avoided. On heavier fowl, this novel elevated grating floor will eliminate the hazard of breast blisters and bruises.

Another advantage of this novel elevated grating floor is that it prevents piling up and smothering of the fowl at all ages, during the brooding period, fresh circulated air being obtained through the grating. Furthermore the work of keeping the enclosures clean is reduced to a minimum as sections or units of gratings can be made up of any desired size, to be readily lifted, the underfloor surface scraped clean, and the sections or units quickly replaced. Special underfloorings are rendered unnecessary as this novel grating floor can be placed directly over the ground or over any other desired surface.

In one form of the invention the base means is formed of inverted V-shaped members formed of metal with a plurality of notches in which the grating bars engage with a bar locking rod disposed on the inner side of the V and extending through openings in the grating bars.

With the above and other objects in view, my invention consists in the arrangement, combination and details of construction disclosed in the drawings and specification, and then more particularly pointed out in the appended claim.

In the drawings:

Figure 1 is a fragmentary plan view, parts being broken away and partly in cross-section, of a grating or perforate floor for a cage or pen constructed according to an embodiment of this invention.

Figure 2 is a sectional view taken on the line 2—2 of Figure 1.

Figure 3 is a fragmentary sectional view taken on the line 3—3 of Figure 1.

Figure 4 is an enlarged fragmentary sectional view taken on the line 4—4 of Figure 3.

Figure 5 is a fragmentary perspective view of one of the base elements.

Referring to the drawings, and first to Figures 1 to 5, inclusive, the numeral 10 designates generally a base member which is of inverted V-shape being formed with upwardly convergent walls 11 connected together at their upper ends by a curved connecting means 13.

The base member 10 is provided with a plurality of spaced notches 12 extending downwardly from the apex thereof, and a plurality of elongated grating bars 14 are adapted to seat in the notches 12. Each bar 14 is formed with a series of spaced openings 15 which are beveled or countersunk at each end thereof, as indicated at 16.

An elongated locking rod 17 is adapted to engage in the apex of each base member 10 and is threaded through the lined openings 15 of the grating bars 14. The forward end of the locking rod 17 is rounded, as at 18, so that the rod 17 will readily engage through the lined openings 15 of the grating bars 14.

There may be as many of the base members 10 as may be desired, and the notches 12 may be spaced apart from each other a suitable distance so that the grating bars 14 will be spaced sufficiently and yet be close enough together so that a fowl, such as a turkey or the like, can walk on the grating bars.

Having described and illustrated one embodiment of this invention in detail, it will be understood that the same is offered merely by way of example, and that the invention is to be limited only by the scope of the appended claim.

The grating unit hereinbefore described will provide a means whereby the bottom of a cage or pen may be easily cleaned, and the feet of the fowl will not come into contact with any droppings on the floor.

The grating hereinbefore described has been particularly designed as an elevated grating floor in a housing enclosure for raising turkeys, but this floor may also be used in housing enclosures used in raising chickens or other fowl, especially brooder houses and so-called sun porches. As referred to herein, the term grating or floor means an elevated grating floor.

The term "pen or cage" for fowl as used herein is meant to encompass any "housing enclosure" as herein mentioned.

What is claimed is:

In a cage or pen for fowl, a perforate floor forming a grating, said floor comprising a plurality of elongated laterally spaced and parallel inverted V-shaped base members having upwardly converging side walls, each of said base members having a plurality of pairs of longitudinally spaced confronting notches formed in said side walls, said notches extending downwardly from the apex of each of said base members, said base members being positioned relative to each other with their respective notches aligned with the notches of adjacent base members to form a plurality of series of aligned notches, an elongated substantially rectangular grating bar seated in each of said series of aligned notches, each of said bars having a plurality of longitudinally spaced and substantially parallel openings formed therein and extending transversely thereof, said openings in one of said bars being in registry with each of said series of notches and aligned with openings formed in adjacent bars to form a plurality of series of aligned openings, and an elongated rod extending through each of said series of aligned openings and seated in the apex of each of said base members to prevent longitudinal or vertical movement of said bars relative to said base members.

References Cited in the file of this patent

UNITED STATES PATENTS

| | | |
|---|---|---|
| 212,645 | Baumann | Feb. 25, 1879 |
| 260,499 | Pratt | July 4, 1882 |
| 813,317 | Murray | Feb. 20, 1906 |
| 1,060,919 | Luten | May 6, 1913 |
| 1,186,669 | Lindbloom | June 13, 1916 |
| 1,259,802 | St. John | Mar. 19, 1918 |
| 1,598,159 | Skinner | Aug. 31, 1926 |
| 1,606,434 | McAfoos | Nov. 9, 1926 |
| 1,620,846 | Wells | Mar. 15, 1927 |
| 1,736,499 | Johnson | Nov. 19, 1929 |
| 1,799,658 | Utzler | Apr. 7, 1931 |
| 1,944,207 | Bates et al. | Jan. 23, 1934 |
| 1,946,035 | Reuter | Feb. 6, 1934 |
| 2,313,211 | Aldrich | Mar. 9, 1943 |

FOREIGN PATENTS

| | | |
|---|---|---|
| 680,736 | Great Britain | Oct. 8, 1952 |